United States Patent
Mao et al.

(10) Patent No.: US 7,539,390 B2
(45) Date of Patent: May 26, 2009

(54) PLAYER AND METHOD FOR PROCESSING A FILE WITH VECTOR-BASED FORMAT

(75) Inventors: Lu-Kang Mao, Hsinchu (TW); Pin-Huang Hsin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 740 days.

(21) Appl. No.: 11/187,751

(22) Filed: Jul. 22, 2005

(65) Prior Publication Data
US 2006/0039684 A1    Feb. 23, 2006

(30) Foreign Application Priority Data
Aug. 23, 2004    (TW) .............. 93125311 A

(51) Int. Cl.
H04N 5/91    (2006.01)
(52) U.S. Cl. ........................................ 386/46
(58) Field of Classification Search .................. 386/46, 386/83, 124–126
See application file for complete search history.

(56) References Cited
U.S. PATENT DOCUMENTS
2003/0206720 A1* 11/2003 Abecassis ................... 386/83

* cited by examiner

Primary Examiner—Thai Tran
Assistant Examiner—Mishawn Dunn
(74) Attorney, Agent, or Firm—J.C. Patents

(57) ABSTRACT

A player and a method for processing a file with vector-based format are disclosed. The player comprises a reading unit, a central processing unit, a memory unit and an output unit. The reading unit is controlled by the central processing unit, which determines whether a file with vector-based format exists in a data storage media. The memory unit, in which software for executing the file with vector-based format is stored, is electrically connected to the central processing unit. The player thus can play the file with vector-based format recorded in the data storage media directly.

7 Claims, 2 Drawing Sheets

PLAYER AND METHOD FOR PROCESSING A FILE WITH VECTOR-BASED FORMAT

CROSS-REFERENCE TO RELATED APPLICATION

This application claims the priority benefit of Taiwan application serial no. 93125311, filed on Aug. 23, 2004. All disclosure of the Taiwan application is incorporated herein by reference.

BACKGROUND OF THE INVENTION

1. Field of the Invention

The present invention relates to a player and a method for processing a file, and more particularly, to a player and a method for processing a file with vector-based format directly.

2. Description of the Related Art

Information technology has delivered convenience to our life that it has greatly impacted on all levels of human lifestyle. In the information explosion age, innovative information is continuously expanding. In order to store such information, an optical storage media with great information storage capacity has become a mainstream of the current storage media. Since it is advantageous in its great storage capacity, easy and long preservation, low cost, and durability of data storage, the optical storage media has gradually replaced the conventional magnetic storage media and become indispensable for storage media. In addition, since both the manufacturing technique of laser photoelectricity products and the compression technique of multimedia are gradually matured, the trend of next generation's optical storage media aims to be thinner, lighter and with a higher capacity. Thus, the DVD (Digital Versatile Disk) having a large storage capacity and the DVD player for playing the DVD are both the most popular products in the market.

Take a DVD player as an example. After a DVD is loaded into a DVD player, the DVD player will automatically play the files recorded in the DVD. In general, a commercial DVD player has various functions such as "fast forward", "speed rewind", "pause" and "stop". Some function like "repeat once" may be added as an option in some DVD players. However, the current DVD player is mainly used in playing video files or music, and both the video files and music are stored as common file formats in a DVD. Such file formats, for example, include WAV file format, MPEG-2 file format, and MP3 file format. The commercial DVD player nowadays does not support the file with vector-based format such as a file with FLASH format.

SUMMARY OF THE INVENTION

The present invention is directed to provide a player capable of playing a file with vector-based format directly.

The present invention is directed to provide a method for processing a file with vector-based format, such that the player can play a file with FLASH format directly.

As embodied and broadly described herein, the present invention provides a player comprising a reading unit, a central processing unit (CPU), a memory unit and an output unit. The reading unit suitable for loading data storage media is configured to read data recorded in the data storage media. The reading unit is controlled by the CPU electrically coupled to the reading unit. In addition, the CPU determines whether a file with vector-based format is stored in the data storage media or stored in the memory unit. The memory unit is electrically coupled to the CPU and software for playing a file with vector-based format is stored in the memory unit. A result of executing the software is output to a monitor by the output unit electrically coupled to the CPU.

In an embodiment of the present invention, the reading unit of the player is for example a CD-ROM drive, a DVD-ROM drive, a CD-R drive, a DVD-R drive or a flash memory card reader.

In an embodiment of the present invention, the memory unit of the player is for example an ROM, an RAM, a hard drive or a combination of ROM, RAM and hard drive.

As embodied and broadly described herein, the present invention provides a method for processing a file with vector-based format in a player. The processing method comprises following steps. First, whether a file with vector-based format is stored in a data storage media or stored in a memory unit is determined. When the file with vector-based format exists in the data storage media or stored in the memory unit, the file with vector-based format is played by the player. In addition, whether software for playing the file with vector-based format is stored in the data storage media or not is further determined. When the software for playing the file with vector-based format is stored in the data storage media, the software for playing the file with vector-based format stored in the data storage media is subsequently executed.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1:
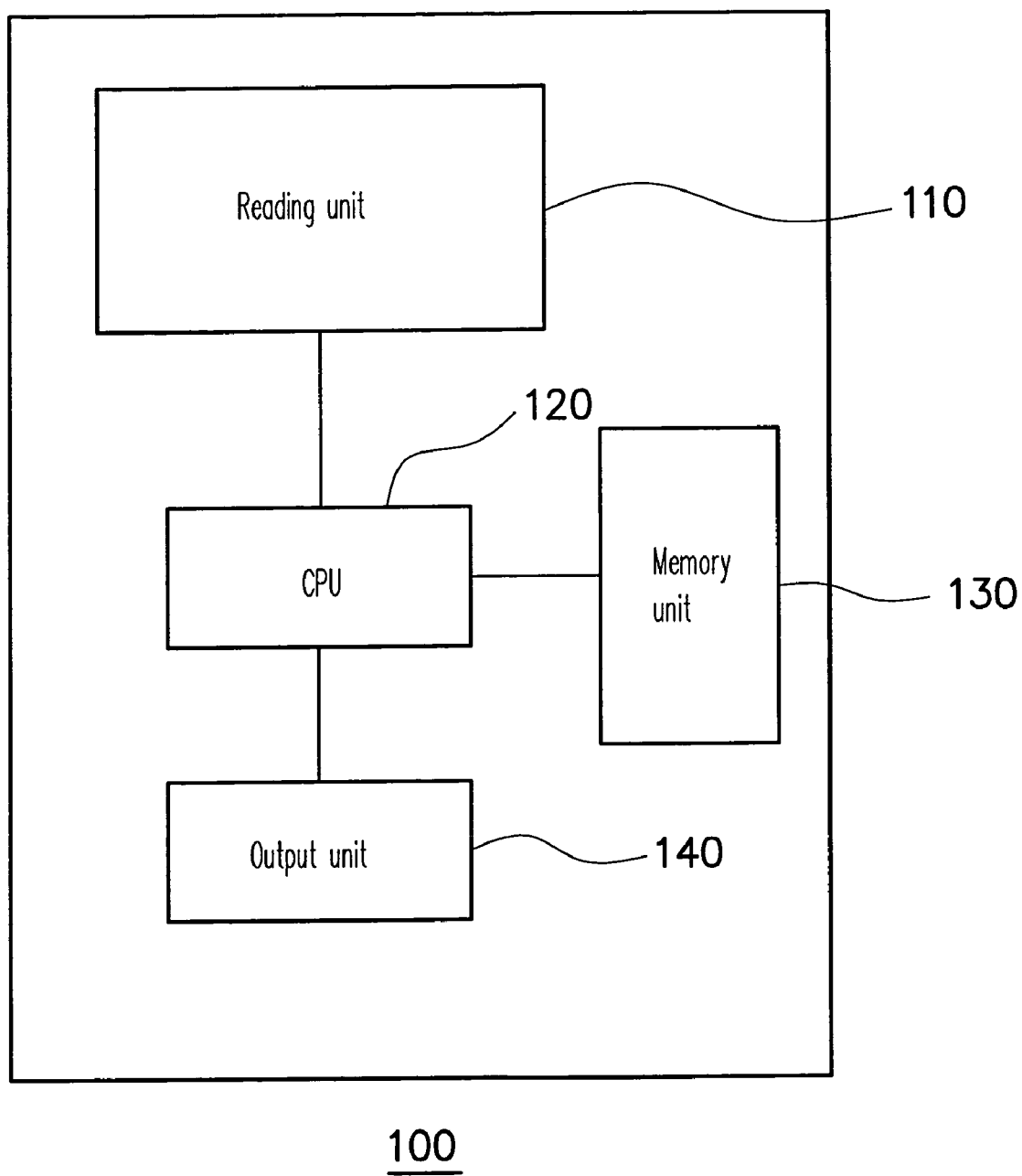
FIG. 1 schematically shows an apparatus for reading an optical storage media according to a preferred embodiment of the present invention.

FIG. 1 schematically shows a player according to a preferred embodiment of the present invention. Referring to FIG. 1, the player 100 of the present embodiment comprises a reading unit 110, a central processing unit (CPU) 120, a memory unit 130 and an output unit 140. The reading unit 110 for loading a data storage media (not shown) is configured to read the data recorded in the data storage media (not shown). The reading unit 110 is controlled by the CPU 120 electrically coupled to the reading unit. Note that the CPU 120 of the present embodiment is suitable for determining whether a file with vector-based format is stored in the data storage device or not; for example, the CPU 120 is adapted to determine whether a FLASH file is existed or not.

As shown in FIG. 1, the memory unit 130 is electrically coupled to the CPU 120, and software for playing the file with vector-based format is stored in the memory unit 130. In the present embodiment, the memory unit 130 is an ROM, an RAM, a hard drive, or combination of ROM, RAM and hard drive, for example. In addition, the output unit 140 is electrically coupled to the CPU 120. The output unit 140 displays the information processed by the CPU 120 on a monitor. Furthermore, in the present embodiment, the data storage media is an optical storage media (e.g. a disc compliant with CD, DVD, MO, or MD specification), and the reading unit is a CD-ROM drive, a DVD-ROM drive, a CD-R drive, or a DVD-R drive. In an alternative embodiment, the data storage media may be a flash memory card, and the reading unit may be a flash memory card reader.

Figure 2:
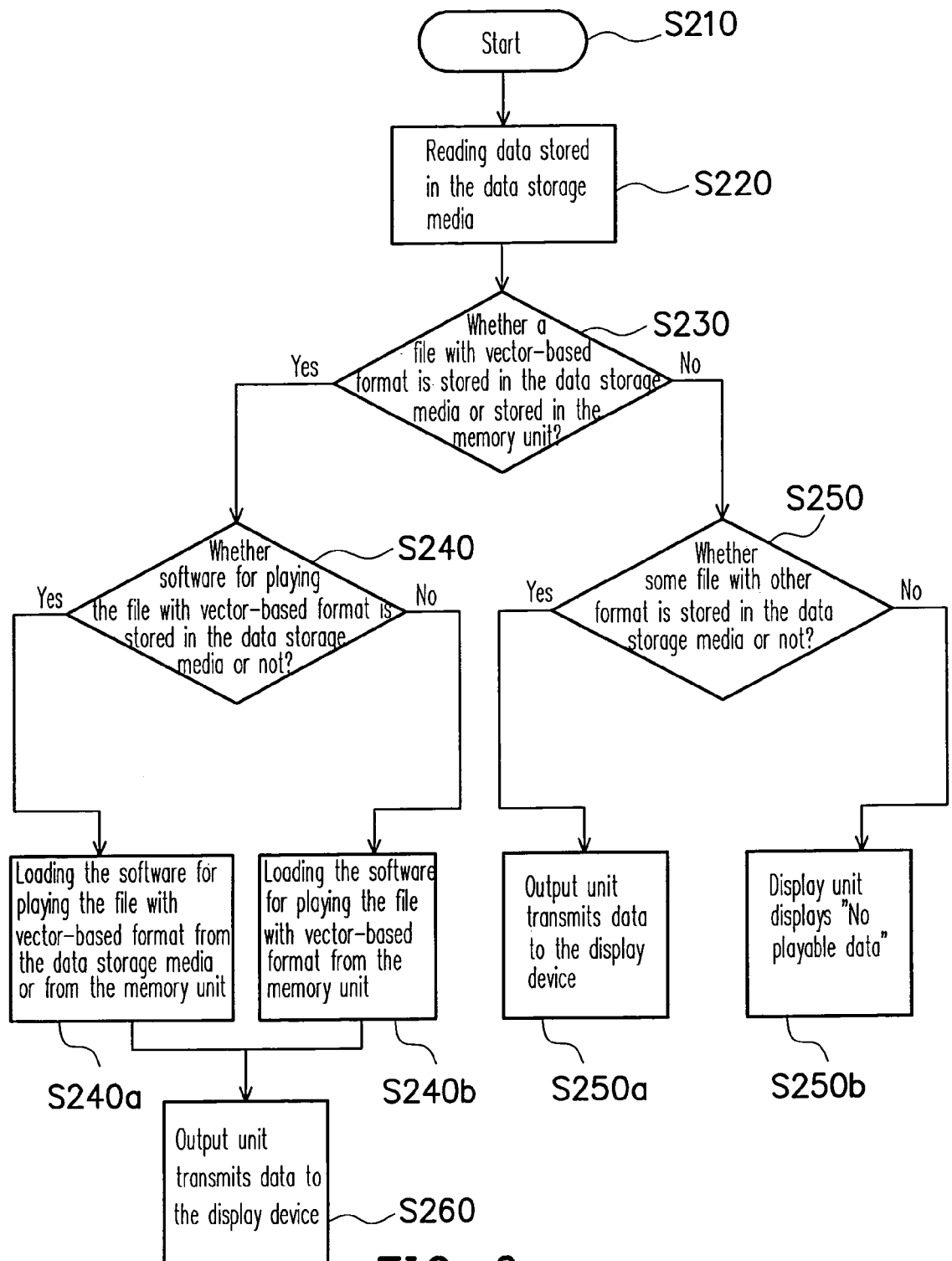
FIG. 2 schematically shows a flow chart illustrating the operation of the apparatus for processing the optical storage media according to a preferred embodiment of the present invention.

FIG. 2 schematically shows a flow chart illustrating a method for processing a file with vector-based format in a player. Referring to FIG. 1 and FIG. 2, in step S210, a data storage media is loaded into the reading unit 110. Then, in step S220, the reading unit 110 reads the data stored in the data storage media, and the read data is sent to the CPU 120 for further processing. In step S230, after the data read by the reading unit 110 has been received by the CPU 120, the CPU 120 determines whether the file with vector-based format is stored in the data storage media or not. In addition, based on different design, some player may store the data read by the reading unit 110 or downloaded from Internet in the memory unit 130. Thus, in step S230, it is to further judge whether a file with vector-based format is stored in the memory unit 130 for playing or not.

When it is determined that the file with vector-based format is stored in the data storage media or the memory unit 130, in step S240, the CPU 120 further determines whether a software for playing the file with vector-based format is stored in the data storage media or not. If the software for playing the file with vector-based format is stored in the data storage media, in step S240a, the CPU 120 executes the software for playing the file with vector-based format stored in the data storage media or in the memory unit 130 and plays the file with vector-based format stored in the data storage media. Otherwise, if the software for playing the file with vector-based format is not stored in the data storage media, in step S240b, the CPU 120 executes the software for playing the file with vector-based format stored in the memory unit 130 and plays the file with vector-based format stored in the data storage media. Then, in step S260, the data processed by the CPU 120 is output by the output unit 140 and is displayed on the monitor. To be noted, the CPU 120 will determine the fact that the software for playing the file with vector-based format is stored in the data storage media or stored in the memory unit only when it is found that the software for playing the file with vector-based format is stored in the data storage media. Appropriate playing software will be selected for execution according to the software version information, the decoder information and the operating system compatibility.

Next, when the CPU 120 has determined that the file with vector-based format is neither stored in the data storage media nor in the memory unit 130 in step S230, the CPU 120 may execute a normal player operation. For example, in the present embodiment, the player continuously determines whether other data is existed in the data storage media or not in step S250. If it is determined that some other files whose format can be recognized by the player (e.g. WAV file, MPEG file, CD-AUDIO file, and MP3 file) is stored in the data storage media, in step S250a, the CPU 120 plays the file and transmits the processed data to the output unit 140, and then the data is sent to the monitor for displaying. Otherwise, if it is judged that there is no data stored in the data storage media or the format of the stored file is not recognized by the player, in step S250b, a message of "No readable data" is shown on the display device, such that the user can recognize the status of the apparatus for reading data stored in the data storage media.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for processing a file with vector-based format in a player, wherein a first software for playing the file with vector-based format is stored in a memory unit, the processing method comprising:
    determining whether the file with vector-based format is stored in a data storage media or stored in the memory unit;
    playing the file with vector-based format when the file with vector-based format exists;
    determining whether a second software for playing the file with vector-based format is stored in the data storage media or not;
    when it is determined that the second software for playing the file with vector-based format is stored in the data storage media, selecting either the first software for playing the file with vector-based format or the second software for playing the file with vector-based format to execute for playing the file with vector-based format; and
    when it is determined that the second software for playing the file with vector-based format is not stored in the data storage media, selecting the first software for playing the file with vector-based format to play the file with vector-based format.

2. The method for processing the file with vector-based format of claim 1, wherein the file with vector-based format is a file with FLASH format.

3. The method for processing the file with vector-based format of claim 1, further comprising executing a normal player operation when the file with vector-based format does not exist, wherein the normal player operation comprising:
    determining whether a file with other format recognized by the player is stored in the data storage media or not; and
    playing the file when the file with other format recognized by the player is stored in the data storage media.

4. The method for processing the file with vector-based format of claim 1, wherein the data storage media is either an optical storage media or a flash memory card.

5. The method for processing the file with vector-based format of claim 1, wherein the memory unit comprises a RAM (Random-Access Memory).

6. The method for processing the file with vector-based format of claim 5, wherein the memory further comprises a hard drive.

7. The method for processing the file with vector-based format of claim 5, wherein the memory unit further comprises a ROM (Read Only Memory).

* * * * *